(12) United States Patent
Janke et al.

(10) Patent No.: US 8,416,058 B2
(45) Date of Patent: Apr. 9, 2013

(54) SECURE METHOD FOR BIOMETRIC VERIFICATION OF A PERSON

(75) Inventors: Marcus Janke, Munich (DE); Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 418 days.

(21) Appl. No.: 12/467,316

(22) Filed: May 18, 2009

(65) Prior Publication Data

US 2009/0289761 A1 Nov. 26, 2009

(30) Foreign Application Priority Data

May 20, 2008 (DE) .......................... 10 2008 024 320

(51) Int. Cl.
- *G05B 19/00* (2006.01)
- *G06K 9/00* (2006.01)
- *G06K 5/00* (2006.01)
- *G06K 19/06* (2006.01)
- *G06K 9/74* (2006.01)
- *H04L 9/32* (2006.01)

(52) U.S. Cl.
USPC .......... 340/5.82; 340/583; 382/115; 382/124; 382/125; 235/380; 235/494; 356/71; 713/176

(58) Field of Classification Search .................. 340/5.82
See application file for complete search history.

(56) References Cited

U.S. PATENT DOCUMENTS

| | | | |
|---|---|---|---|
| 6,282,304 B1 * | 8/2001 | Novikov et al. | 382/125 |
| 6,332,193 B1 * | 12/2001 | Glass et al. | 713/170 |
| 6,668,072 B1 | 12/2003 | Hribernig et al. | |
| 6,961,452 B2 | 11/2005 | Fujii | |
| RE41,198 E * | 4/2010 | Dunn | 382/115 |
| 8,190,901 B2 * | 5/2012 | Barr et al. | 713/176 |
| 2005/0010776 A1 * | 1/2005 | Kenen et al. | 713/176 |
| 2008/0062402 A1 | 3/2008 | Rouget et al. | |

FOREIGN PATENT DOCUMENTS

WO 9852149 A1 11/1998

OTHER PUBLICATIONS

Vital Signs of Identity ("It had to be you") Miller B., Rockville, MD, USA Publication Date: Feb. 1994 vol. 31, Issue 2, pp. 22-30.

\* cited by examiner

*Primary Examiner* — Jennifer Mehmood
*Assistant Examiner* — John Mortell

(57) ABSTRACT

In various embodiments, a method for biometric verification of a person is provided. The method may include detecting a biometric sample of a biometric characteristic of the person, and reading out a stored biometric feature from a data carrier and carrying out a comparison of the stored biometric feature with the detected biometric sample by means of a control unit; wherein at least one data area of the stored biometric feature is altered by means of disturbances, the control unit determines the altered disturbed data area of the stored biometric feature and omits the determined disturbed data areas during the comparison.

15 Claims, 2 Drawing Sheets

SECURE METHOD FOR BIOMETRIC VERIFICATION OF A PERSON

CROSS-REFERENCE TO RELATED APPLICATION

This application claims priority to German Patent Application Serial No. 10 2008 024 320.5, which was filed May 20, 2008, and is incorporated herein by reference in its entirety.

TECHNICAL FIELD

Embodiments relate generally to a method for biometric verification of a person, a data carrier and a data processing unit for use in the method, a computer program for carrying out the method and suitable for execution on a computer, and a method for producing a data carrier with a biometric feature stored therein.

TECHNICAL FIELD

Machine identification of persons is increasingly gaining in importance. Possibilities for use include, inter alia, access controls, automatic teller machines, communication devices, electronically readable personal identity cards and electronically readable passports ("ePassport"). Personal properties suitable for identification are for example the pattern of the bloodstreams of the retina, the structure of the iris, the length and shape of the fingers, the face, the voice or fingerprints. In this case, these personal properties can be stored in a suitable electronic storage medium, for example as a digital image, and can thus be retrieved as required. In a conventional way of identifying persons on the basis of these biometric features, fingerprints are widely used and highly reliable for personal identification. Fingerprints of each individual person are individually characterized. Even for twins fingerprints are not identical.

Identification by means of the so-called minutiae is conventionally used in the case of machine identification. Minutiae are end points, bifurcations, islands or other singular locations in the fingerprint. The fingerprint to be identified is therefore usually examined in respect of what minutiae it has. The minutiae determined are assigned to a type and their position with respect to one another is determined. A fingerprint is described by this method. The result thus obtained can then be stored as an image or pattern in a storage medium and serves as a basis for a comparison of a fingerprint to be identified.

In this case, there is the risk that for example entire fingerprints, but also other biometric properties, which can be stored as an image, but also in any other electronically storable form, could serve as it were as a template for an unauthorized use. In particular, images of stored biometric images could be read out and/or concomitantly read in an unauthorized manner and they could then be fed in as a replacement of the original image, or "counterfeit" fingertips could be produced therefrom. Using these fingertips, systems for biometric authentication could then be attacked in a targeted manner, or, at a scene of criminal acts, fingerprints could be left behind by means of the counterfeit fingertips.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
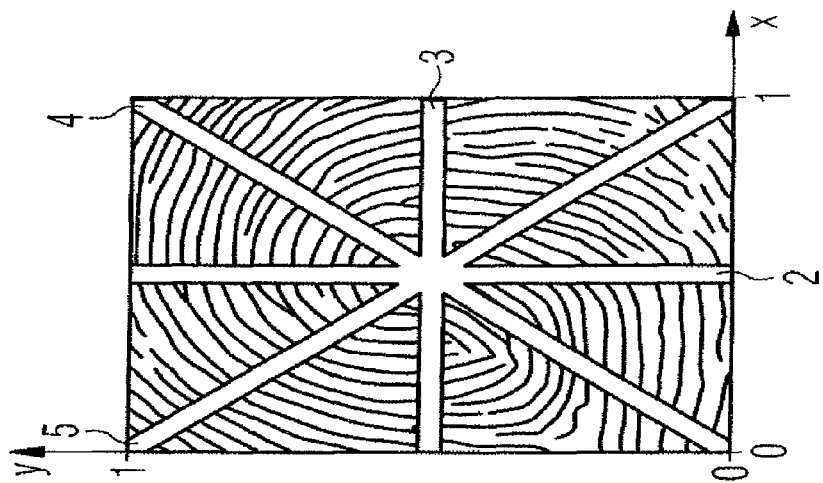
FIG. 1 shows an undisturbed original image of a fingerprint in accordance with an embodiment.

No alterations caused by means of disturbances are discernible in FIG. 1. The image can likewise show a fingerprint 100 recorded by means of an image acquisition unit when a person is checked. Said fingerprint 100 can then be compared with an image stored for example in the ePassport, bank card, driver's license etc. (FIGS. 2 and 3) and be identified by the method for authentication of a person.

Figure 2:
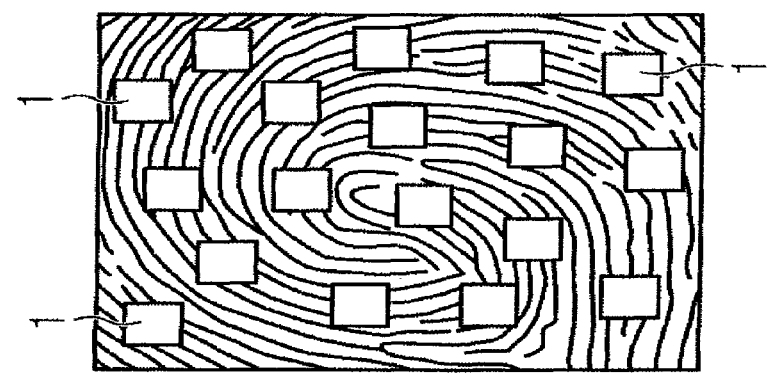
FIG. 2 shows an example of a stored image with disturbances 1 at random selected locations in accordance with an embodiment.

In FIG. 2, the original value of the image is replaced by a special value at randomly selected locations 1. The random selection may be effected for example by the use of a function for generating random values, by means of an RNG (random number generator). The random result supplied by the RNG then may define the storage location of the stored biometric image which is replaced by a special value. Such a special value can be for example an extreme value such as logic "0" or a maximum value such as logic "1". It is furthermore conceivable for a random value determined by the RNG to form a corner point for example of a square, a rectangle or the midpoint of a circle, etc. The original values which lie within the area formed by the geometric figures may then all be replaced by a special value.

Figure 3:
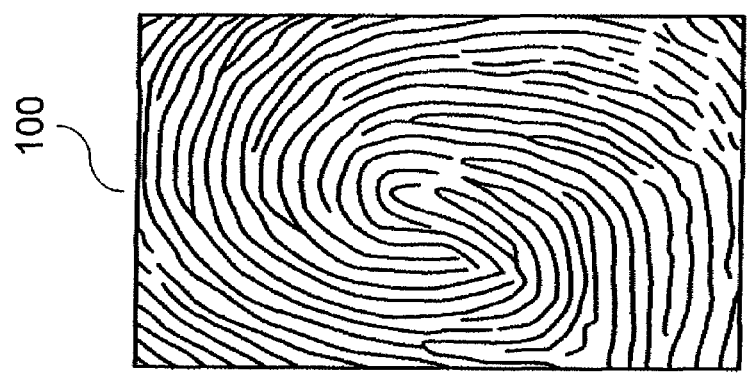
FIG. 3 shows an example of a stored image with disturbances 2, 3, 4, 5 at systematically determined locations in accordance with an embodiment.

FIG. 3 illustrates a biometric image with systematically determined disturbances in one possible embodiment.

The systematically determined disturbances 2, 3, 4, 5 illustrated in FIG. 3 arise by virtue of the fact that the original values of the biometric image were replaced by special values at the locations produced by the disturbances 2, 3, 4, 5. The locations of the disturbances 2, 3, 4, 5 arise on the basis of the following mathematical correlations: for the disturbance 2, $y=x/2$; in the case of the disturbance 3, $x=y/2$; in the case of the disturbance 4, $y=x$; and in the case of the disturbance 5, $x=-y+1$.

In this example, the original value of the biometric image may be replaced by a special value at the systematically determined locations. Such a special value may be for example an extreme value such as logic "0" or logic "1".

Only four possibilities of systematic disturbances are illustrated by way of example in FIG. 3. Further embodiments of systematically determined disturbances are conceivable in addition to the embodiments described.

Various embodiments provide a method, a data carrier, a data processing unit and a computer program for biometric verification of a person, and a method for producing a data carrier with a biometric feature stored therein, by means of which the risk of misuse of the stored data after unauthorized access may be reduced or minimized.

Figure 4:
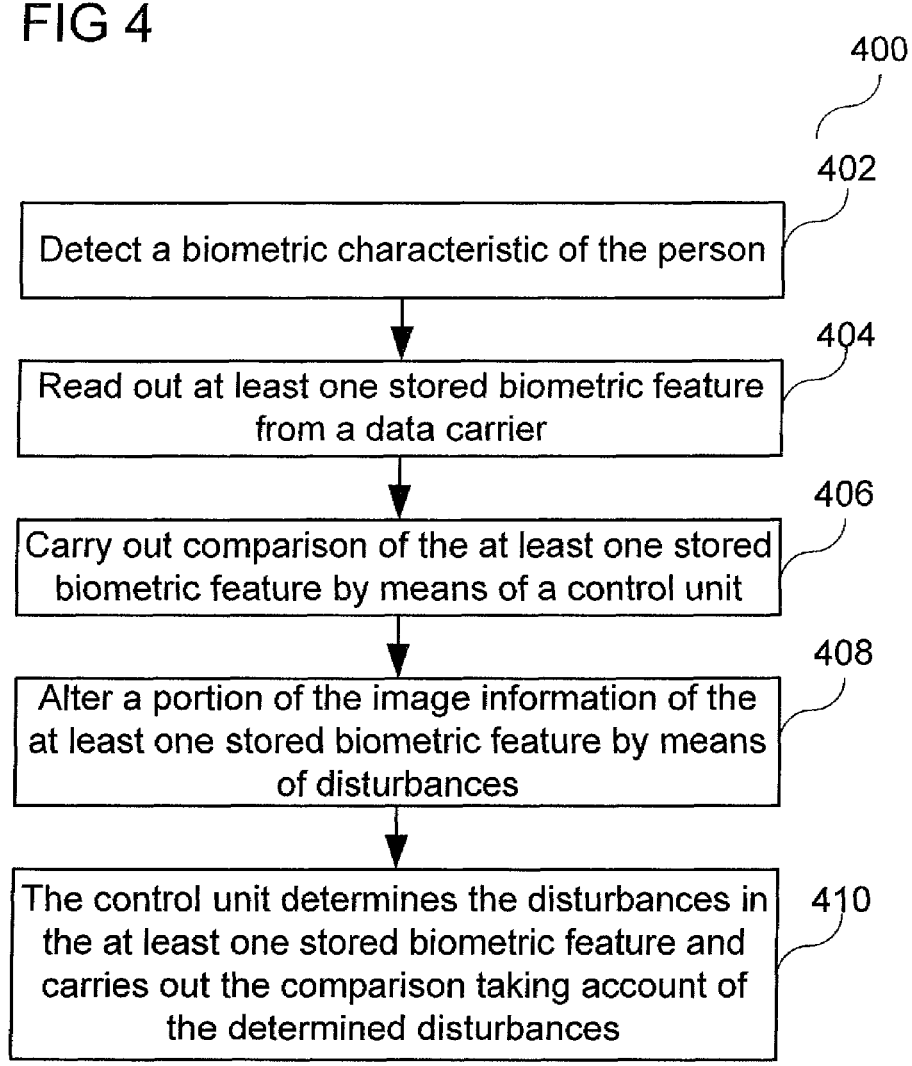
FIG. 4 shows a method of biometric verification of a person in accordance with an embodiment.

In a method 400 of biometric verification of a person in accordance with various embodiments, as shown in FIG. 4, a biometric characteristic of the person may be detected (Process 402). Furthermore, in 404, at least one stored biometric feature may be read out from a data carrier and, in 406, a comparison of the at least one stored biometric feature may be carried out by means of a control unit. In 408, a portion of the image information of the at least one stored biometric feature may be altered by means of disturbances. In 410, the control unit may determine the disturbances in the at least one stored biometric feature and may carry out the comparison taking account of the determined disturbances. One effect of this solution may consist in the fact that, in the event of for example artificial fingertips being produced or in the event of unauthorized read-out of images by unauthorized entities, on the basis of the disturbed images, it may be possible immediately to recognize whether a counterfeit is involved.

In various embodiments, the disturbances are embodied in such a way that they replace biometric data in the disturbed data area.

When carrying out the method, the disturbances may be embodied in such a way that they replace biometric data in the disturbed data area by a special value.

In the method for biometric verification of a person, the disturbances may be embodied in such a way that the special value is an extreme value relative to the range of values of the data in the biometric feature.

Furthermore, one configuration when carrying out the method may consist in the fact that the position of the disturbed data area within the stored biometric feature is stored in the control unit or in the data carrier.

In the method, the control unit may determine a data area whose data have a specific value or lie in a specific range of values as the altered disturbed data area of the stored biometric feature.

In the method for biometric verification of a person, the data carrier may be for example an identity card, a passport, a driver's license or an insurance card.

According to various embodiments, a data carrier in which at least one data area of the one stored biometric feature has been altered by means of disturbances is suitable for use in a method for biometric verification of a person.

In various embodiments, a control unit may be suitable for use in the method for biometric verification of a person, wherein the control unit may be set up in such a way that it detects a biometric sample of a biometric characteristic of the person, reads out a stored biometric feature from a data carrier, determines the altered disturbed data area of the stored biometric feature and carries out a comparison of the stored biometric feature with the detected biometric sample, wherein it omits the determined disturbed data areas during the comparison.

It may be provided to use a computer program for carrying out the method for biometric verification of a person if the program is executed by a control unit.

In various embodiments of a method for producing a data carrier with a biometric feature stored therein, at least one data area of a biometric feature describing a biometric characteristic of a person may be altered by means of disturbances and the altered biometric feature is stored in the data carrier.

In various embodiments of the method for producing a data carrier, the disturbances for altering the data area are suitable for making the disturbed data area recognizable as a disturbed data area.

In various embodiments of the method for producing a data carrier, a data area may be altered at a predetermined position by means of disturbances.

In various embodiments of the method for producing a data carrier, all the data of the data area which is to be changed by means of disturbances may be overwritten with a fixed desired value.

In various embodiments of the method for producing a data carrier, the biometric feature may be stored in a format which provides a predetermined permissible range of values for data, and all the data of the data area which is to be changed by means of disturbances may be overwritten with an extreme value of the permissible range of values.

In various embodiments of the method for producing a data carrier, prior to the change by means of disturbances, the data of the biometric feature which correspond to a special value may be overwritten with an alternative value that is different from the special value, and all the data of the data area which is to be changed by means of disturbances may be overwritten with the special value.

The exemplary embodiments outlined are embodiments of the method for biometric verification of a person, and are therefore also suitable for use in a data carrier (for example passport, insurance card, personal identity card, etc.) and a control unit (for example chip in a smart card, computer systems, central computers, etc.) which are suitable for use in the described method of biometric verification of a person. Furthermore, the embodiments outlined are configurations of the method for producing a data carrier with a biometric feature stored therein.

In various embodiments a method, a data carrier, a control unit and a computer program for biometric verification of a person are provided. In this case, a biometric sample of a biometric characteristic of a person is detected and furthermore at least one stored biometric feature may be read out from a data carrier and a comparison of the stored biometric feature with the detected biometric sample may be carried out by means of a control unit. Furthermore, a portion of the data area of the stored biometric feature may then be altered by means of disturbances and the control unit may determine the disturbances of the altered data area of the stored biometric feature and may omit the determined disturbed data areas during the comparison. Furthermore, the various embodiments disclose a method for producing a data carrier with a biometric feature stored therein, in which method at least one data area of a biometric feature describing a biometric characteristic of a person may be altered by means of disturbances and the altered biometric feature may be stored in the data carrier.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for biometric verification of a person, the method comprising:

detecting a biometric sample of a biometric characteristic of the person;

reading out a stored biometric feature from a data carrier and carrying out a comparison of the stored biometric feature with the detected biometric sample by means of a control unit;

wherein at least one data area of the stored biometric feature is altered by means of disturbances at a predetermined biometric image frame position, the control unit determines the altered disturbed data area of the stored biometric feature and omits the determined disturbed data areas during the comparison.

2. The method as claimed in claim 1,
wherein the disturbances are embodied in such a way that they replace biometric data in the disturbed data area.

3. The method as claimed in claim 2,
wherein the disturbances are embodied in such a way that they replace biometric data in the disturbed data area by a special value.

4. The method as claimed in claim 3,
wherein the special value is an extreme value relative to the range of values of the data in the stored biometric feature.

5. The method as claimed in claim 1,
wherein the position of the disturbed data area within the stored biometric feature is stored in at least one of the control unit and the data carrier.

6. The method as claimed in claim 1,
wherein the control unit determines a data area whose data have a specific value or lie in a specific range of values as the altered disturbed data area of the stored biometric feature.

7. The method as claimed in claim 1,
wherein the data carrier is an identity card.

8. A data carrier for use in a method as claimed in claim 1, comprising:
a biometric feature stored in the data carrier, wherein at least one data area of the stored biometric feature is altered by means of disturbances.

9. A control unit for use in a method for biometric verification of a person, the method comprising:
detecting a biometric sample of a biometric characteristic of the person;
reading out a stored biometric feature from a data carrier and carrying out a comparison of the stored biometric feature with the detected biometric sample, through a minutia identification and comparison process, by means of a control unit;
wherein at least one data area of the stored biometric feature is altered by means of disturbances at a predetermined biometric image frame position, the control unit determines the altered disturbed data area of the stored biometric feature and omits the determined disturbed data areas during the comparison;
wherein the control unit is set up in such a way that it
detects a biometric sample of a biometric characteristic of the person,
reads out a stored biometric feature from a data carrier,
determines the altered disturbed data area of the stored biometric feature and carries out a comparison of the stored biometric feature with the detected biometric sample,
wherein it omits the determined disturbed data areas during the comparison.

10. A non-transitory computer-readable media for carrying out a method for biometric verification of a person on a computer, the method comprising:
detecting a biometric sample of a biometric characteristic of the person;
reading out a stored biometric feature from a data carrier and carrying out a comparison of the stored biometric feature with the detected biometric sample, through a minutia identification and comparison process, by means of a control unit;
wherein at least one data area of the stored biometric feature is altered by means of disturbances at a predetermined biometric image frame position, the control unit determines the altered disturbed data area of the stored biometric feature and omits the determined disturbed data areas during the comparison.

11. A method for producing a data carrier with a biometric feature stored therein, in which method at least one data area of a biometric feature describing a biometric characteristic of a person is altered by means of disturbances at a predetermined biometric image frame position and the altered biometric feature is stored in the data carrier.

12. The method as claimed in claim 11,
wherein the disturbances for altering the data area are suitable for making the disturbed data area recognizable as a disturbed data area.

13. The method as claimed in claim 11,
wherein all the data of the data area which is to be changed by means of disturbances are overwritten with a fixed desired value.

14. The method as claimed in claim 11,
wherein the biometric feature is stored in a format which provides a predetermined permissible range of values for data, and all the data of the data area which is to be changed by means of disturbances are overwritten with an extreme value of the permissible range of values.

15. The method as claimed in claim 11,
wherein prior to the change by means of disturbances, the data of the biometric feature which correspond to a special value are overwritten with an alternative value that is different from the special value, and all the data of the data area which is to be changed by means of disturbances are overwritten with the special value.

* * * * *